United States Patent [19]
Willis

[11] Patent Number: 5,175,619
[45] Date of Patent: Dec. 29, 1992

[54] PROGRESSIVE SCAN TELEVISION SYSTEM USING LUMINANCE LOW FREQUENCIES FROM PREVIOUS FIELD

[75] Inventor: Donald H. Willis, Indianapolis, Ind.

[73] Assignee: Thomson Consumer Electronics, Inc., Indianapolis, Ind.

[21] Appl. No.: 617,983

[22] Filed: Nov. 26, 1990

[51] Int. Cl.$^5$ .............................................. H04N 7/01
[52] U.S. Cl. ...................................... 358/140; 358/11
[58] Field of Search ................... 358/140, 11, 37, 166, 358/142, 105, 31, 36

[56] References Cited

U.S. PATENT DOCUMENTS

| | | | |
|---|---|---|---|
| 4,400,719 | 8/1983 | Powers | 358/21 R |
| 4,415,931 | 11/1983 | Dischert | 358/242 |
| 4,426,661 | 1/1984 | Okada et al. | 358/140 |
| 4,451,848 | 5/1984 | Okada et al. | 358/140 |
| 4,509,071 | 4/1985 | Fujimura et al. | 358/11 |
| 4,558,347 | 12/1985 | Pritchard et al. | 358/11 |
| 4,598,309 | 7/1986 | Casey | 358/11 |
| 4,623,913 | 11/1986 | Fling et al. | 358/11 |
| 4,639,783 | 1/1987 | Fling | 358/166 |
| 4,641,186 | 2/1987 | Pritchard | 358/105 |
| 4,672,445 | 6/1987 | Casey et al. | 358/140 |
| 4,673,978 | 6/1987 | Dischert et al. | 358/140 |
| 4,716,462 | 12/1987 | Wargo et al. | 358/166 |
| 4,870,482 | 9/1989 | Yasuki et al. | 358/36 |
| 5,012,326 | 4/1991 | Sakamoto et al. | 358/11 |

FOREIGN PATENT DOCUMENTS

| | | |
|---|---|---|
| 58-79379 | 5/1983 | Japan . |
| 2-057081 | 2/1990 | Japan . |
| 8603921 | 7/1986 | PCT Int'l Appl. . |
| 2114848 | 8/1983 | United Kingdom . |
| 2168219 | 6/1986 | United Kingdom . |

Primary Examiner—Victor R. Kostak
Attorney, Agent, or Firm—Joseph S. Tripoli; Peter M. Emanuel; Richard G. Coalter

[57] ABSTRACT

A progressive scan processor includes an input circuit which produces a video difference signal representative of a difference between a first low frequency component derived from a current line of a video input signal and a second low frequency component derived by motion adaptive processing from a selected previous line of the video input signal. A line-rate doubling output circuit combines a line of the double line-rate difference signal with every other line of the double line-rate input signal to form a progressively scanned output signal. Advantageously, the system exhibits the relatively high vertical resolution and motion artifact immunity characteristic of motion adaptive systems as well as substantially reduced system memory requirements characteristic of "dual band" processors and it provides "dual band" processing of high and low frequency video components without the need for complementary band splitting filters having special amplitude and phase response characteristics.

12 Claims, 9 Drawing Sheets

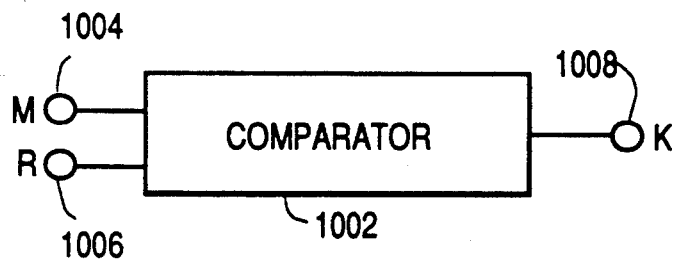
FIG. 10
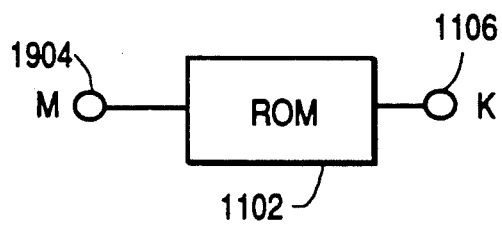
FIG. 11
FIG. 12
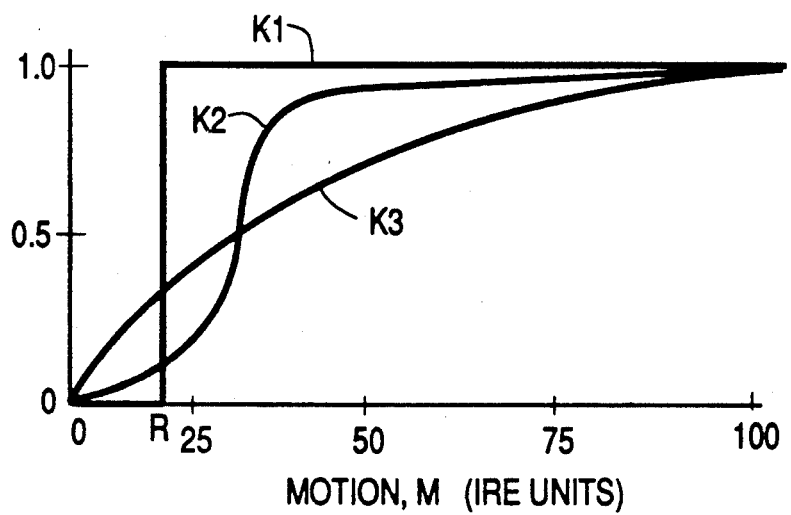

PROGRESSIVE SCAN TELEVISION SYSTEM USING LUMINANCE LOW FREQUENCIES FROM PREVIOUS FIELD

FIELD OF THE INVENTION

This invention relates to television systems of a type in which interlaced video input signals are converted to a non-interlaced or "progressively scanned" form for display.

BACKGROUND OF THE INVENTION

Television systems are known in which an interlaced video signal is converted to a non-interlaced or "progressively scanned" form in which the number of horizontal lines displayed in a field is doubled. Advantageously, such systems reduce the visibility of the line structure of displayed images.

Since doubling the number of displayed lines requires more lines than are actually transmitted, there have been a number of proposals for obtaining the required "additional" lines. An example of a system in which the required "extra" lines for display are obtained by repeating lines of a received signal is described by R. A. Dischert in U.S. Pat. No. 4,415,931 entitled TELEVISION DISPLAY WITH DOUBLED HORIZONTAL LINES which issued Nov. 15, 1983. An example of a system in which the "extra" or interstitial lines are obtained by interpolation of adjacent vertical lines of the received signal is described by K. H. Powers in U.S. Pat. No. 4,400,719 entitled TELEVISION DISPLAY SYSTEM WITH REDUCED LINE-SCAN ARTIFACTS which issued Aug. 23, 1983. Other examples include the system described by Fujimura et al. in U.S. Pat. No. 4,509,071 entitled DOUBLE SCANNING NON-INTERLACE TELEVISION RECEIVER which issued Apr. 2, 1985 and the system described by Okada et al. in U.S. Pat. No. 4,451,848 entitled TELEVISION RECEIVER INCLUDING A CIRCUIT FOR DOUBLING LINE SCANNING FREQUENCY which issued May 29, 1984.

The above mentioned systems describe arrangements in which extra lines for display are derived from a currently received field of a video input signal. This form of progressive scan conversion is commonly known as "intra-field" or "line" conversion and has an advantage in that there are no visible artifacts produced for images containing field-to-field motion. However, there is a disadvantage in that the vertical resolution of displayed images is not improved and may be degraded, particularly where vertical interpolation is employed, and this tends to "soften" displayed images.

It has been widely recognized that the added lines needed for a progressive scan display can be obtained from a previous field rather than from a currently received field. Such systems are known generally as "field" or "inter-field" progressive scan systems and double the number of displayed lines by interleaving lines of a currently received field with lines of a previously received field. An advantage of "field" progressive scan processing is that still images are produced with the full vertical resolution of an originally scanned frame of video.

An example of a "field progressive scan" system is described by Okada et al. in U.S. Pat. No. 4,426,661 entitled TELEVISION RECEIVER INCLUDING A CIRCUIT FOR DOUBLING LINE SCANNING FREQUENCY which issued Jan. 17, 1984. See also, U.K Application GB 2,114,848A of Achiha et al. published Aug. 24, 1983 and entitled COLOR TELEVISION SIGNAL LINE DOUBLING CIRCUIT. Unfortunately, field progressive scan systems suffer from a problem in that if field-to-field motion exists in a scene the displayed images will be blurred. A further problem with progressive scan processors of the type in which extra lines are derived from a previous field is that a relatively substantial amount of memory is required for storing (delaying) the lines of the previous field.

It has been recognized, however, that one may obtain a desirable reduction in the memory requirements of a field type progressive scan system by utilizing only the low frequency components of the previous field and the high frequency components of a current field in forming the extra lines for display. Such a system is described in the Japanese laid open patent application of Tanaka et al., Kokai No. SHO 58-79379 entitled TELEVISION RECEIVER which was laid open on May 13, 1983. Although a desirable reduction in memory requirements is achieved in the Tanaka system, the problem of motion-related artifacts remains. An additional problem is that the system disclosed requires a pair of "matched" low-pass and high-pass filters for separating the video signal. Such filters require carefully selected amplitude and phase characteristics to separate high and low video signal components without forming a gap or overlap between them and are relatively complex and expensive.

Another example of a progressive scan processing system employing different processing of high and low frequency components is described by Dischert et al. in U.S. Pat. No. 4,673,978 entitled PROGRESSIVE SCAN PROCESSOR WITH PLURAL FREQUENCY BAND INTERPOLATION which issued Jun. 16, 1987. In this system the extra or "interstitial" lines for display are produced by adding a frame-combed and low pass filtered component of a video signal to a field delayed, line comb filtered and high pass filtered component of the video signal. The combined low and high frequency components are spatially and temporally coincident thereby reducing the visibility of motion artifacts (double images) during display. The system is "non-adaptive" in that the processing is not a function of scene motion.

Systems have been proposed in which the problem of vertical resolution characteristic of line-progressive scan systems and the problem of motion blur characteristic of field progressive scan systems has been approached by making the systems "motion adaptive". In motion adaptive systems a motion detector is used to switch between the two basic types of processors as a function of motion. For example, when the incoming video signal represents a still image the signal is processed by a field type processor which generates extra lines for display by interleaving the currently received lines with lines of a previous field. Conversely, when the incoming video signal represents a moving image, the extra lines for display are obtained by interpolation (or repeating) lines of the currently received field. For images that are not still and are not in full motion it is customary to "blend" or mix the outputs of line and field type processors in proportion to the magnitude of the motion.

Examples of "motion adaptive" progressive scan converters are described, for example, by Wargo et al. in U.S. Pat. No. 4,716,462 entitled MOTION ADAPT- IVE TELEVISION SIGNAL PROCESSING SYSTEM which issued Dec. 29, 1987 and in U.S. Pat. No. 4,598,309 entitled TELEVISION RECEIVER THAT INCLUDES A FRAME STORE USING NON-INTERLACED SCANNING FORMAT WITH MOTION COMPENSATION which issued to R. F. Casey on Jul. 1, 1986.

A problem characteristic of motion adaptive systems is that the memory requirements for providing motion detection are far greater than the requirements for merely providing field progressive scan processing when motion detection is implemented in the usual way by comparing video signals delayed by one full frame. One approach to avoiding the requirement for a full frame of memory is to detect motion by measurement of the video signal sideband energy. An example of such a system is described by D. H. Pritchard in U.S. Pat. No. 4,641,186 entitled MOTION DETECTOR THAT EXTRACTS MOTION INFORMATION FROM SIDEBANDS OF A BASEBAND TELEVISION SIGNAL which issued February 1987. Although a full frame of memory is avoided, the sideband energy motion detection method is, however, relatively complicated.

SUMMARY OF THE INVENTION

The present invention resides in part in the recognition of the need for a progressive scan system which effectively avoids the foregoing problems while retaining the advantages of each of the earlier solutions.

Progressive scan conversion apparatus, embodying the invention includes a source for providing a video input signal of a given line rate. A processor, coupled to the source, provides a video difference signal representative of a difference between a first low frequency component derived from a current line of said video input signal and a second low frequency component derived from at least one previous line of the video input signal. An output circuit time compresses and combines the video difference and input signals and forms a progressive scan output signal.

In an exemplary embodiment of the invention, the output circuit includes circuit means for doubling the line rate of the video difference signal, for doubling the line rate of the video input signal and for adding a line of the double line-rate video difference signal to every other line of the double line-rate video input signal for forming said progressive scan output signal.

In presently preferred embodiment of the invention, the video input signal is of digital form, the processor includes means for sub-sampling the video input signal prior to forming the video difference signal and the output circuit includes means for up-sampling the video difference signal prior to the addition of the double line-rate video signals to form the progressive scan output signal.

BRIEF DESCRIPTION OF THE DRAWING

The foregoing and further features of the invention are described hereinafter and are illustrated in the accompanying drawing wherein like elements are denoted by like reference designators and in which:

FIGS. 10 and 11 are block diagrams of control signal generators suitable for use in the receiver of FIG. 1;

FIG. 12 is a response diagram illustrating various transfer functions of the control signal generators of FIGS. 10 and 11;

DETAILED DESCRIPTION

Figure 1:
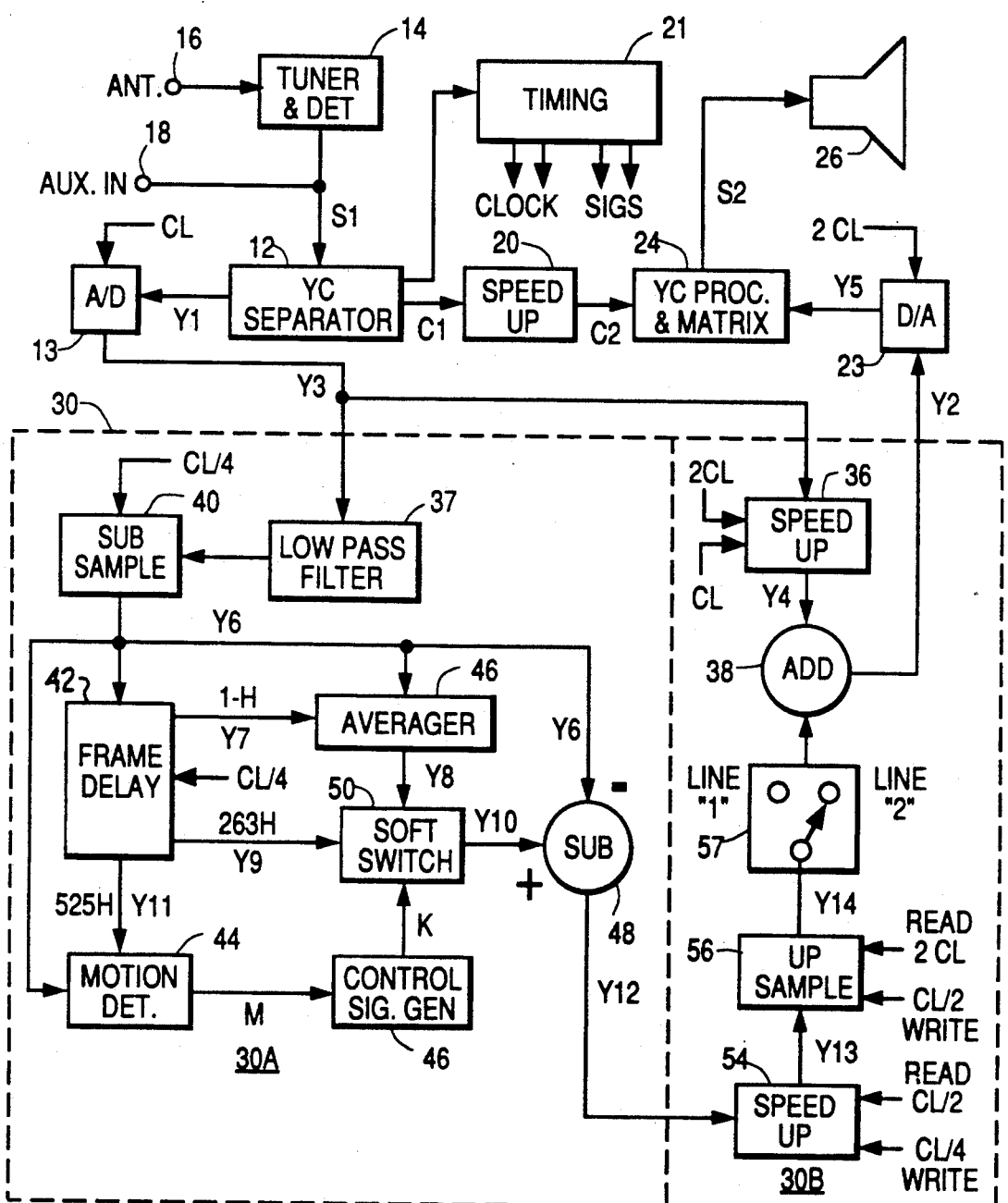
FIG. 1 is a block diagram of a television receiver embodying the invention.

The television receiver 10 of FIG. 1 includes a progressive scan processor 30 (outlined in phantom) comprising an input unit 30A (outlined in phantom) and an output unit 30B (outlined in phantom). As an over-view of certain salient features of the invention, the input unit 30A provides a video difference signal (Y12) representative of a difference between a first low frequency component (Y6) derived from a current line of a video input signal (Y3) and a second low frequency component (Y10) derived from at least one previous line of the video input signal (Y3). The output unit 30B processes the video difference signal (Y12) and the video input signal (Y3), as will be explained, to form a progressive scan luminance output signal (Y2) of double the line rate of the input signal.

Advantageously, the combination of the input (30A) and output (30B) units of the progressive scan processor (30A,30B) provide a progressive scan output signal (Y2) having the relatively high vertical resolution characteristic of field progressive scan systems; having the motion artifact immunity characteristic of line progressive scan systems; having the motion adaptability characteristic of motion adaptive systems; and having substantially reduced system memory requirements as compared with conventional motion adaptive systems. Additionally, the system provides "dual band" video processing without requiring the use of conventional complementary high pass and low pass filters for band splitting.

In more detail, the receiver 10 of FIG. 1 comprises a luminance-chrominance signal separation circuit 12 which separates a composite video input signal S1 into a luminance component Y1 and a chrominance component C1. The input video signal S1 may be provided by a conventional tuner, IF amplifier and detector unit 14 from an antenna or cable input 16 or, alternatively, it may be provided by an auxiliary input terminal 18 or some other suitable source. Separation circuit 12 may be of conventional design such as a comb filter or a combination of high and low pass filters as is well known.

The separated chrominance signal component C1 is applied to a speed-up unit 20 which time compresses and repeats each line thereof to provide a chrominance output signal C2 having double the line rate of the video input signal and in which each line is repeated. Examples of suitable "speed-up" circuits are described later.

The luminance signal Y1 is converted to digital form by means of an analog-to-digital (A/D) converter 13 and the digitized luminance signal Y3 is applied to a luminance signal progressive scan processor 30 (outlined in phantom) which generates a motion adaptive double line-rate progressively scanned luminance output signal Y2 as will be described. This signal is converted back to analog form (Y5) by means of a digital to analog (D/A) converter 23 and the double line-rate signals C2 and Y5 are applied to a conventional luminance-chrominance signal processing unit 24 which provides such functions as color demodulation, brightness and contrast control and color matrixing so as to provide a progressively scanned output signal S2 of a form (e.g., RGB component form) suitable for display by a kinescope 26 or some other display device (e.g., an LCD device or a projection display).

Since the line rate of the output signal S2 is twice that of the input signal S1, the images produced by kinescope 26 have twice as many lines as the input signal whereby the visibility of raster line structure is substantially reduced as compared with conventional interlaced images.

Clock signals CL for converters 13 and 23 (and other timing signals for the receiver 10) are provided by a timing signal generator 21. This generator may comprise a phase locked loop (PLL) generator of conventional design locked to a multiple of the color burst component of the input signal S1 or locked to a multiple of the line frequency of the input signal S1. Typical sampling clock frequencies are three or four times the frequency of the color subcarrier for systems employing what is commonly called "burst locked" clocking. In a presently preferred implementation of the system the timing signal generator 21 is phase locked to a multiple of the horizontal line rate. This is commonly called "line locked" clock generation and has an advantage over burst locking in that the system is usable with so-called non-standard video sources where the relationship between line and burst frequencies may vary. Illustratively, in this specific example of the invention, the clock frequency CL is selected to be 1024 times the horizontal line rate of the video input signal. For NTSC standard sources, this frequency CL is about 16.1 megaHz. Other clock signals provided by timing unit 21 include CL/4 and 2CL which are used for sample rate conversions as will be explained. Unit 21 also provides horizontal and vertical line rate frequencies used for deflection purposes.

The remaining portion of FIG. 1 comprises the progressive scan processor 30 that provides the motion adaptively processed progressively scanned luminance output signal Y2. It will be noted that the motion adaptive components of Y2 are derived by processing only sub-sampled low frequency components of the luminance signal Y3. Advantageously, restricting the processing in this manner greatly reduces the amount of memory required for implementing line, field and frame delays necessary for motion adaptive processing as compared with processing of full bandwidth signals.

A further advantage, as will be explained, relates to the use of "differential" processing (i.e., processing of signal differences rather than absolute values). Differential processing, as used in the present invention, eliminates the need for special high pass and low pass filters having matched amplitude and phase response characteristics that are required in conventional split-band processing systems as previously described. Such high pass and low pass filters having truly complementary amplitude and phase characteristics are complex and expensive.

In more detail, for purposes of illustration and explanation of this embodiment of the invention, the progressive scan processor 30 is divided, by phantom lines, into two portions comprising an input circuit 30A and an output circuit 30B.

In input circuit 30A of progressive scan processor 30 the full bandwidth luminance signal Y3 is applied to a sub-sampling circuit 40 by means of a low pass filter 37. Sub-sampling unit 40 is clocked at a rate of CL/4 and greatly reduces the luminance signal data rate and thus reduces the number of bytes of memory required for implementing video delay functions. As an example, if the full bandwidth luminance signal is digitized at a the assumed clock rate of (about) 16 MHz and then subsampled at a 4 MHz clock rate then only one-quarter of the memory will be needed to implement the same digital delay as would be required if the signal were not sub-sampled. One may, if desired, select other clock rates and sub-sampling rates in a specific application of the principles of the invention.

To avoid aliasing, the sub-sampled signal is low pass filtered prior to sub-sampling and this function is provided by low pass filter 37. A suitable cut-off frequency for filter 37 is about one-half of the sub-sampling rate (e.g., about 2 MHz for the assumed sub-sampling rate of about 4 MHz.) In practice, it is desirable that the filter cut-off frequency be slightly lower than half the sub-sampling rate to allow for the finite slope of the filter response in the transition region between the filter pass band and the filter stop band. An exemplary cut-off frequency, for the assumed sampling frequency. is about 1.5 MHz for 6 dB of attenuation at band edge. This frequency is well below the Nyquist rate of 2.0 MHz for the assumed sampling rate of about 4 MHz. Advantageously, this reduces the number of filter elements needed to implement the anti-aliasing low pass filter 37. For applications where the sub-sampling rate is higher, then proportionally higher anti-aliasing filter cut-off frequencies may be used.

The sub-sampled and low-pass filtered luminance signal Y6 is applied to the inputs of a tapped frame delay unit 42, a motion detector 44, an averager 46 and a substrator 48. Delay unit 42 has output taps providing a one-line (1-H) delayed luminance signal Y7, a one field delayed (263 H) delayed luminance signal Y9 and a frame (525H) delayed luminance signal Y11. For PAL standard systems the field delay would be 313 lines and the frame delay would be 625 lines. The one line (1-H) delayed output tap of delay unit 42 is connected to the other input of averager 46 which provides a line averaged output signal Y8.

A "soft switch" 50 combines the averaged luminance signal Y8 with a field delayed luminance signal Y9 to provide a combined or "blended" luminance output signal Y10 in which the proportions of the Y8 and Y9 components are controlled by motion detector 44 and a control signal generator 46. An example of a suitable soft switch is shown and described later. Motion detector 44 has one input connected to receive the non-delayed luminance signal Y6. It has a second input connected to receive a frame delayed luminance signal Y11 provided by delay unit 42 and provides a motion indicating signal M representative of the difference between signals Y6 and Y11. A suitable motion detector is shown and described later. The purpose of control signal generator 46 is to convert the motion signal M, which is linearly related to motion, to a control signal K which is non-linearly related to motion so as to provide a better match to the motion sensitivity of the human visual system. Examples of suitable control signal generators are shown and described later.

Soft switch 50 responds to the control signal K by selecting the field delayed luminance signal Y9 under conditions of little or no motion (K=0) and selecting the line averaged luminance signal Y8 under conditions of high motion (K=1). For intermediate values of motion the signals Y8 and Y9 are blended in proportion to the non-linear control signal K provided by control signal generator 46.

The resultant "motion adapted" luminance signal Y10 provided by soft switch 50 is applied to the second input of substractor 48 which receives the non-delayed, sub-sampled and low-pass filtered luminance signal Y6 at its other input and provides a luminance output difference signal Y12. The signal Y12 is a video difference signal representative of a difference between a first low frequency component (Y6) derived from a current line of the video input signal and a second low frequency component (Y10) derived from at least one previous line of the video input signal.

The output circuit 30B of progressive scan processor 30 selectively combines the video difference signal (Y12) with the full bandwidth video input signal Y3 to form the progressive scan video output signal Y2. In output circuit 30B the full bandwidth luminance signal Y3 is applied to a speed-up unit 36 which time compresses and repeats each line thereof to provide a double line-rate luminance output signal Y4 in which each line is time compressed by a factor of two and repeated. The difference signal Y12 produced by substractor 48 is applied to a luminance signal speed-up unit 54 that time compresses each line thereby doubling the line rate of the difference signal Y12. Doubling the line rate of the sub-sampled signal Y12 also doubles the sample rate (e.g., from 4 to 8 MHz for the assumed clock) of the speeded up signal Y13. The sample rate of signal Y13 is then applied to a sample rate converter ("UP SAMPLE") 56 that quadruples the sample rate of the time compressed signal Y13. This sample rate conversion may be implemented by repeating samples or by interpolating samples. Accordingly, for the assumed clock and sub-sampling values, the processed low frequency difference signal Y14 at the output of "up-sample" converter 56 equals about 32 MHz which equals the sample rate of the speeded-up broad band luminance signal Y4.

The sample rate equalization or "matching" of the processed liminance signal lows (Y14) and the full bandwidth liminance signal (Y4) allows the direct addition of these signals in adder 38 to form the liminance progressive scan signal Y2. The last step, prior to the addition, is to apply signal Y14 to a switch 57 which is synchronized with the line frequency so as to modify every other line of the processed signal Y4 to produce the progressive scan output signal Y2.

In the embodiment of FIG. 1 described thus far there has been shown and described a progressive scan processor 30 having a number of features which include: (1) motion artifacts are minimized by motion adaptive processing provided by switch 50 which selects line averaged or field delayed signals as a function of motion; (2) memory requirements are substantially reduced by processing sub-sampled low frequency luminance components taken from the present line and a selected previous line; and (3) the processed output signal is formed by combining processed low frequency difference components with the full bandwidth luminance signal. This latter feature completely eliminates the need for complementary high pass and low pass filters having matched amplitude and phase responses as would otherwise be required if the luminance signal band were to be "split" or divided into high-pass and low-pass components for processing of the signal.

The foregoing description presents the general operation of processor 30 in FIG. 1. The overall operation is relatively complex because it depends on picture content but may be easily understood by considering a few specific examples. As a first example, assume that the video image being processed is a still picture. For this case there is no frame-to-frame difference in pixels (picture elements) and so the output M of motion detector 44 will be zero indicating no motion. Control signal K provided by generator 46 is a non-linear function of M as previously noted. For purposes of illustration it will be assumed that K equals zero for the case where M equals zero. Soft switch 50 will respond to the zero value of control signal K by selecting the field delayed output signal Y9 of frame delay unit 42. Substractor 48 will thus subtract the field delayed low frequency component Y9 from the current low frequency component Y6 to provide the difference signal Y12. Adder 38 will then add one line of the speeded up and sample rate converted difference signal Y14 (selected by switch 57) to every other line of the speeded up full bandwidth luminance signal Y4 to form the progressive scanned luminance output signal Y2.

As a result of the addition in adder 38, the luminance signal will comprise two components in different frequency bands even though the system employs no high pass filters. A first component, taken from a currently received line, will equal a high frequency component of the full bandwidth signal Y3 for frequencies above the cut-off frequency of low pass filter 37. A second component will equal a low frequency component, selected by filter 37, taken from the previous field. This may be understood by considering that the difference signal Y12 actually comprises two low frequency components (Y6 and Y10) and the phase of a selected one of these components (Y6) is reversed due to the substraction. Accordingly, ignoring for the moment the speed-up and sample rate conversions, the output signal Y2 equals the full bandwidth luminance signal Y3, minus the low frequency component of Y3 passed by filter 37, plus the low frequency component of Y3 passed by filter 37 but taken from the previous field. When these signals are combined the low frequency components of the current line of signal Y3 simply cancel out because they are out of phase. The missing lows due to the cancellation are replaced by the lows from the previous field (Y10). Since high frequency components of signal Y3 are not processed in processor 30A these components of Y3 are not disturbed and form the high frequency component of the output signal Y2.

Briefly summarized, for the still image example, alternate lines of the output signal Y2 comprise the full bandwidth luminance signal Y3 and the in-between or "interstitial" lines comprise a high frequency component (above the cut-off frequency of filter 37) taken from the currently received line (Y3) and a low frequency component (9) taken from the previous field. Accordingly, for this example low frequency video components that are displayed will exhibit the full vertical resolution of a complete video frame. Visually, the effect is to increase the vertical resolution of displayed still images as compared with standard interlaced images.

As a further example of overall operation of the FIG. 1 system, consider the case in which there is substantial motion in a scene. In this case the soft switch 50 selects only the line averaged low frequency luminance signal Y8 so that the low frequency difference signal Y12 equals the difference between the low frequency component Y6 of a current line and the average Y8 of the low frequency components of the current and a previous line. When these signals are speeded up and converted to the same sample rates in output circuit 30B the resultant sum signal (for every other line) comprises a low frequency component equal to the average of the current and previous lines and a high frequency component taken from the current line. For the remaining lines the output equals the current line.

For the case where motion exists between full motion (M=1) and no motion (M=0) switch 50 blends the line averaged signal Y8 and the field delayed signal Y9 to form the signal Y10 which after subtraction of signal Y6 forms the difference signal Y12. As a result, the output signal Y2 includes a high frequency component derived from the currently received line and a low frequency component derived (by motion dependent blending in switch 50) from two lines of the current field or one line of a previous field depending on the degree of the image motion.

In the foregoing discussion of processing of still images in FIG. 1 it was noted that the difference signal Y12 was formed by subtracting Y6 from Y10 and that this resulted in a reversal of the phase of the current low frequency component Y6 relative to the phase of the full bandwidth signal Y6 to thereby cancel these components when they are later combined by addition in adder 38. As an alternative, the signal Y10 may be substrated from Y6 to form the difference signal Y12 along with modifying the output circuit 30B as will now be described.

Figure 2:
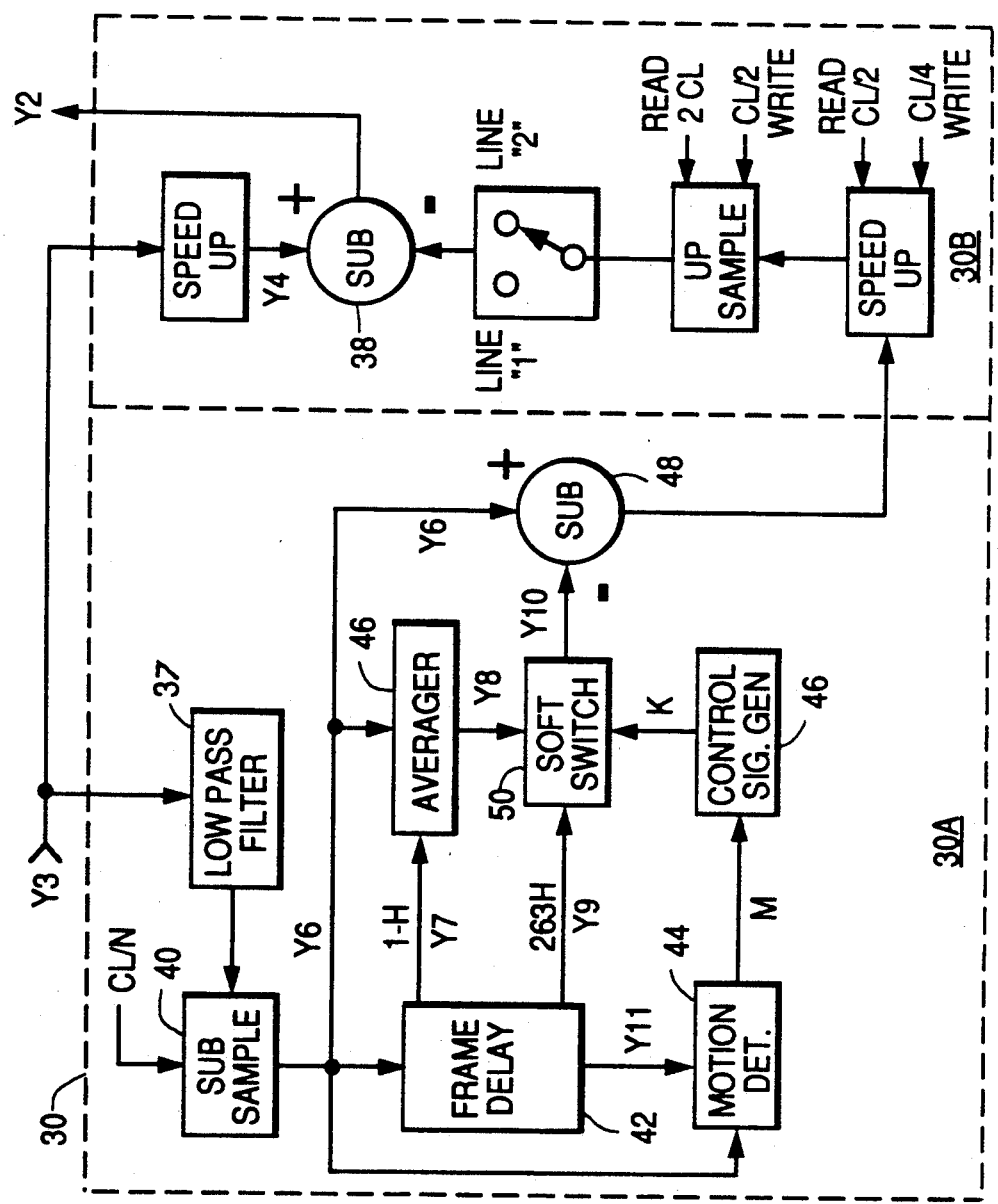
FIG. 2 is a block diagram illustrating a modification of a portion of the receiver of FIG. 1.

FIG. 2 illustrates a modification of the progressive scan processor 30 of FIG. 1 wherein the inputs to subtractor 48 are reversed in input circuit 30A and in output circuit 30B the adder 38 is replaced by a subractor 39 that subtracts every other line of signal Y14 from the full bandwidth luminance signal Y4. This embodiment of the invention is functionally identical to that of FIG. 1 and is structurally identical except for the two noted changes.

In more detail, in the FIG. 1 embodiment signal Y6 was subtracted from signal Y10 to form the low frequency difference signal Y12. The addition of signals Y12 and Y3 (after speedup and sample rate equalization) resulted in an output signal Y2 having high frequency components taken from the current line and low frequency components derived from the previous line or field. In FIG. 2 the same result is obtained when the inputs of subtractor 48 in input circuit 30A are reversed by replacing the adder 38 in output circuit 30B with a subtractor 39. The functional result is the same because in this example the signal "blended" low frequency luminance signal Y10 is doubly inverted by subtractors 48 and 39 and so is effectively added to the signal Y3 whereas the low frequency luminance signal Y6 is inverted only once (in subtractor 39) and is thus effectively subtracted from signal Y4. This is exactly the same result as is achieved in the example of FIG. 1.

In view of the foregoing, it does not make a functional difference if one subtracts Y6 from Y10 and later adds signals Y14 and Y4 (as in FIG. 1) or if one subtracts signal Y10 from Y6 and later subtracts signal Y14 from Y4 as in FIG. 3. However, the example of FIG. 1 is presently preferred because it requires only one subtractor (rather than two) and thus requires less hardware for implementation since addition is less complicated in digital processing than subtraction. In addition to the apparent economic benefit of using fewer parts, the example of FIG. 1 has the technical advantage as well of providing higher reliability as there are fewer parts to fail.

Figure 3:
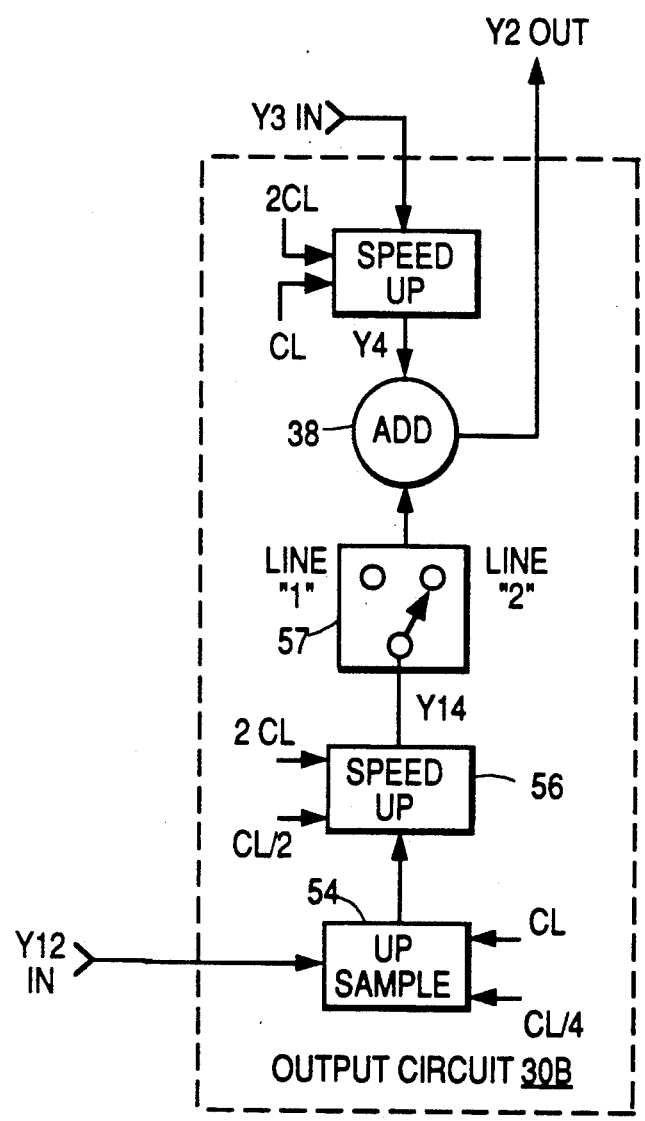
FIG. 3 is a block diagram illustrating another modification of a portion of the receiver of FIG. 1.

FIG. 3 illustrates a modification of the output circuit 30A of progressive scan processor 30 wherein the positions of the sample rate converter ("up-sample") circuit 54 and the speed-up circuit 56 are reversed in the cascade connection of these two circuit elements. To effect this change all that is required is an appropriate selection of the various clock frequencies. The speed-up circuit, for example requires a read clock that is twice the write clock frequency and the sample rate conversion requires a read clock that is four times the write clock frequency. In the example of FIG. 1 where speed-up is done before sample rate conversion the speed-up circuit receives a write clock frequency of CL/4 (e.g., 4 MHz) and a read clock frequency of CL/2 (e.g., 8 MHz) and the sample rate converter receives a write clock frequency of CL/2 (e.g., 8 MHz) and a read clock frequency of 2CL (e.g., 32 MHz). In the example of FIG. 3, where sample rate conversion is done before speed-up the clock frequencies are changed as follows: (1) the write and read clocks for speed-up are changed to CL and 2CL, respectively, (e.g., 16 and 32 MHz) and (2) the write and read clocks for sample rate conversion are changed to CL/4 and CL, respectively (e.g., about 4 and 16 MHz). The overall operation of the speed-up and sample rate converters provides exactly the same result as in the example of FIG. 1 in that the sub-sampled difference signal Y12, after sample rate conversion and speed-up, is of the same line rate and sample rate as the speeded up full bandwidth luminance signal Y3 and so these signals may be combined (by addition as in FIG. 1 or by subtraction as in FIG. 2) to provide the progressively scanned output signal Y2.

Figure 4:
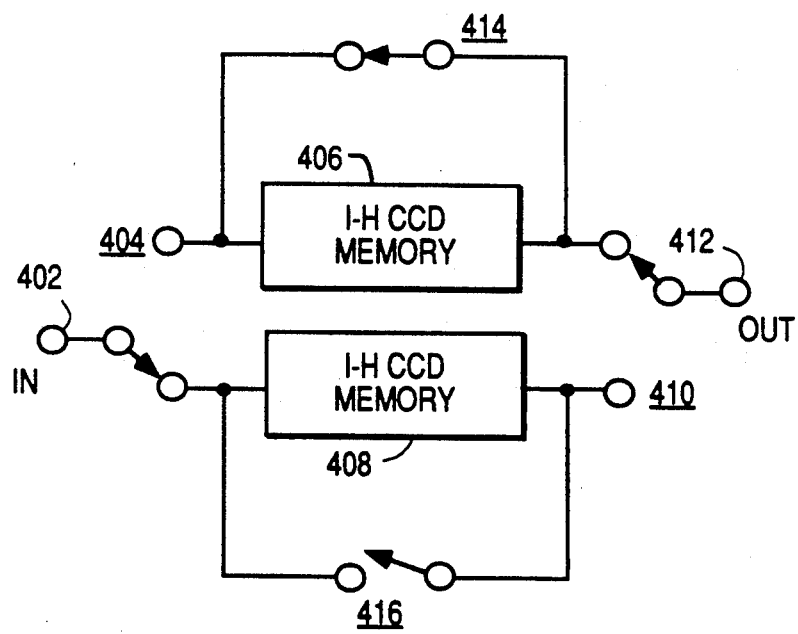
FIG. 4 is a block diagram of a "speed-up" circuit suitable for use in the receiver of FIG. 1.
Figure 5:
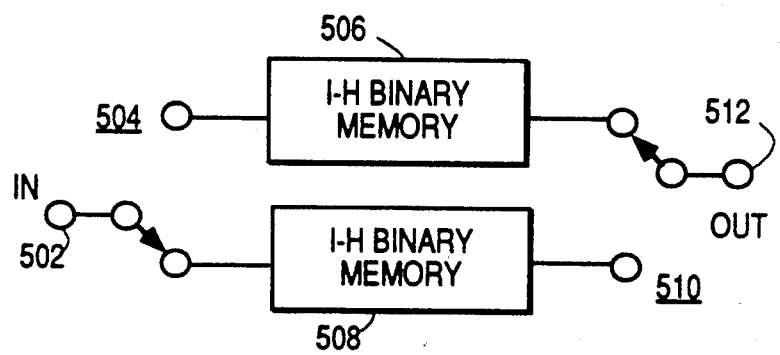
FIG. 5 is a block diagram of an alternative "speed-up" circuit suitable for use in the receiver of FIG. 1.

FIGS. 4 and 5 are exemplary of "speed-up" circuits suitable for doubling the line rate of chrominance or luminance input signals in the receiver of FIG. 1. In FIG. 4 video signals to be "speeded-up" at input 402 are alternately applied via a line rate operated "write" switch 404 to a pair of one line (1H) CCD memories 406 and 408. As one line is being stored in one of the memories the other memory is "read" at double the write clock rate and coupled to an output 412 via a read switch 410. Since the read clock rate is twice the write clock rate the input signal is thereby time compressed and repeated and so the output signal is of double the input signal line rate with each line being repeated. Since CCD memories require refreshing to be read twice, each of the memories 406 and 408 includes a respective "refresh" switch 414 and 416 connected between its input and output terminals which are closed during a read operation to re-circulate the CCD memory contents thereby repeating stored data for the second of the two read cycles of the memory. This particular speed-up circuit may be used for speeding up the chrominance component C1 in the example of FIG. 1 for the case where the signal separation filter 12 provides a chrominance output signal of analog form. Advantageously, this form of speedup circuit accepts analog signals directly without need for analog to digital conversion. Another alternative (for digital input signals) is to use a dual port memory (as discussed later) which is less complex that separately switched one-line memories.

The speed-up circuit of FIG. 5 is similar to that of FIG. 4 but employs digital (binary) memories as storage devices rather than CCD type storage devices. Operation is otherwise the same as in the example of FIG. 4 with the exception that refresh circuits are not required for the digital memory. This type of speed-up circuit may be used directly for the luminance signal processing in processor 30 because the signals there are already of binary form. To use this speed-up circuit for the chrominance signal C1 in the example of FIG. 1, it would be necessary to add an analog-to-digital converter to the input of switch 504 and to add a digital to analog converter to the output (512) of switch 510. This would not be necessary, of course if the signal separaion circuit 12 is a digital type of circuit providing output signals that are already of digital form rather than analog form. If the example of FIG. 1 is modified to provide digital signal separation, then analog to digital converter 13 may be eliminated.

Figure 6:
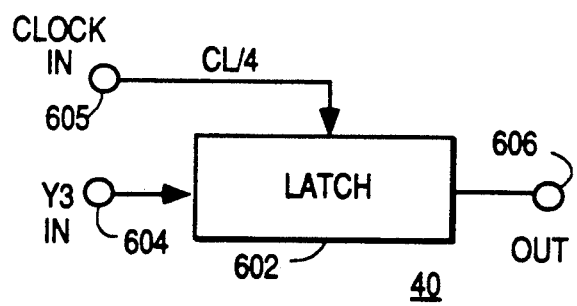
FIG. 6 is a block diagram of a sub-sampling circuit suitable for use in the receiver of FIG. 1.

FIG. 6 is exemplary of a sub-sampling circuit suitable for use as circuit 40 in processor 30A. The circuit comprises a latch 602 having a data input 604 which receives the low pass filtered luminance signal Y3, having a clock input 605 to which the sub-sampling clock signal is applied and having an output 606 providing the sub-sampled output signal Y6. The data latch may be clocked at a rate CL/N where N is a number greater than unity. Preferably, N is an integer such as 2, 3 or 4. As an alternative, N may be an non-integer fraction. The advantage of using integer values for N (which is preferred) is that no interpolation is required to produce the sub-sampled signal. However, non-integer values of N may be employed in a particular system if desired. The presently preferred integer sub-sampling values are 2, 3 and 4.

In the specific embodiment shown herein, for purposes of illustration of the invention, the value of N is chosen to be N=4. For the four-to-one sub-sampling assumed in the example of FIG. 1 which uses a clock frequency of CL/4, the latch 602 would discard three out of four samples of the low pass filtered luminance signal Y3. Accordingly, for this sub-sampling value (N=4) the memories required for implementing video delay need be only one-quarter as large as would be required if the video signal were not sub-sampled.

Figure 7:
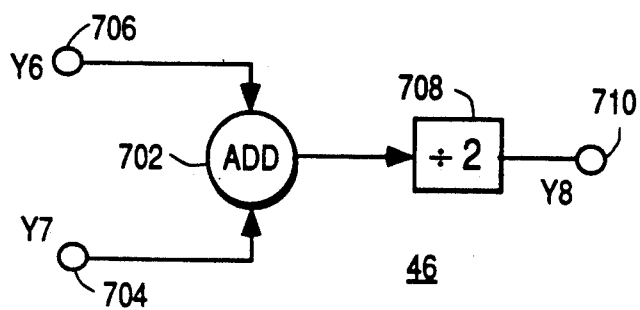
FIG. 7 is a block diagram of an averaging circuit suitable for use in the receiver of FIG. 1.

Averager 46 may be implemented as shown in FIG. 7 by applying the non-delayed and 1-H delayed signals to the inputs (704,706) of an adder 702 and dividing the adder output by two with a divider 708 to thereby provide a line averaged output signal Y8 at output terminal 710. In practice, the divider may be implemented by simply not using the LSB output of the adder and thus providing a one bit shift of the adder outputs. For systems in which the signal processing at this point is done in analog form the divider would be replaced by a 6 dB attenuator and the adder would be replaced by a summing network.

Figure 8A:
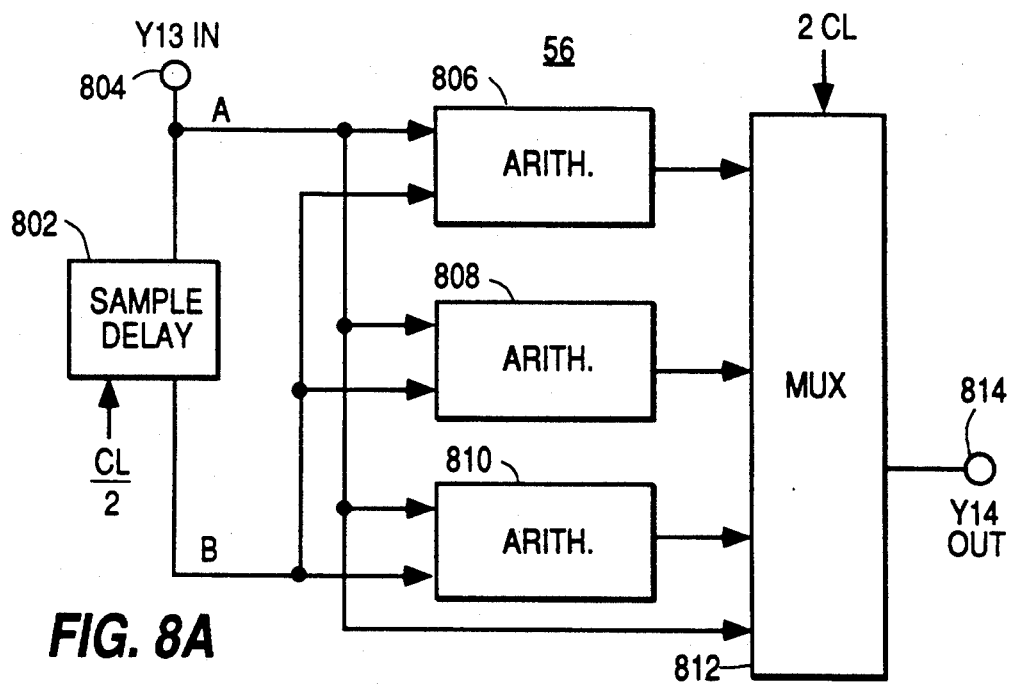
FIGS. 8A and 8B are block diagrams of a sample rate converters of the interpolation type suitable for use in the receiver of FIG. 1.

FIG. 8A is an example of a sample rate converter of the "interpolating type" which may be used for quadrupling the sample rate of the luminance difference signal. As previously explained, one may provide sample rate up-conversion by simply repeating each sub-sampled pixel four times. Sample rate up-conversion by repeating samples, however, tends to produce images with relative coarse diagonal line structure. Interpolating converters, such as in FIG. 8A (and FIG. 8B discussed later), exhibit smoother diagonal lines but somewhat "softer" horizontal transitions.

In more detail, converter 56 in FIG. 8A includes a sample delay unit 802 having an input 804 to which the sub-sampled luminance signal Y13 is applied. Delay unit 802 also receives a clock signal CL/2 which equals the sample rate of signal Y13 and so imparts a one sample delay to signal Y13. The input (A) and output (B) signals of delay unit 802 are applied to the inputs of three arithmetic units 806,808, and 810 which generate respective output signals of $(3A+B)/4$, $(A+B)/2$ and $(A+3B)/4$. The output signals of arithmetic units 806, 808 and 810 and the input signal of delay unit 802 are applied to a multiplex (MUX) switch 812 which sequentially selects the signals at a clock rate of 2CL. This clock rate is four times the clock rate applied to sample delay unit 802 and so the interpolated and multiplexed signals provided by switch 812 to output terminal 814 have four times the sample rate as the input signal Y13.

Figure 8B:
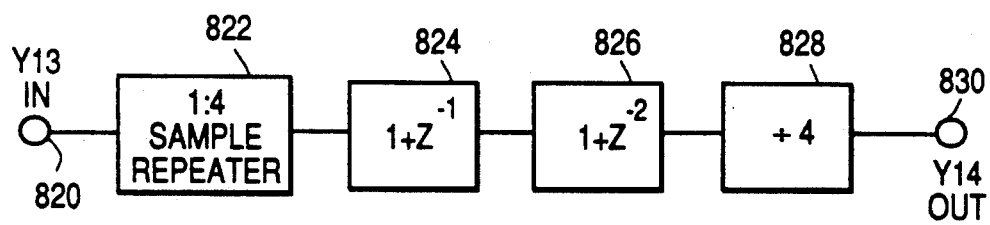
Figure 9:
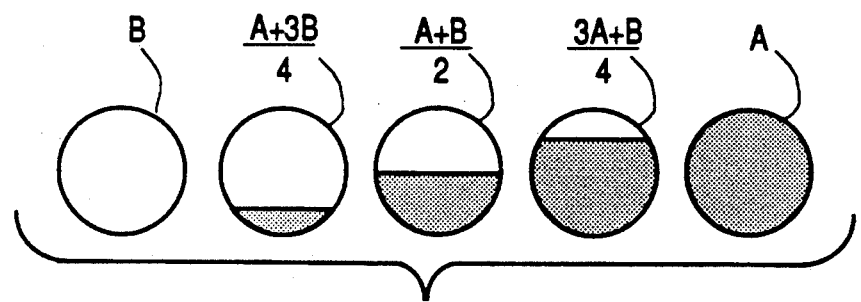
FIG. 9 is a pixel diagram of the sample rate converters of FIGS. 8A and 8B.

FIG. 9 is a pixel diagram illustrating the operation of the sample rate converter of FIG. 8A (and FIG. 8B, discussed later) for the case where the currently received pixel A is at black level (e.g., zero IRE units) and the previous pixel B was at white level (e.g., 100 IRE units). As shown, multiplex switch 812 sequentially selects the arithmetic unit outputs to provide interpolated pixels having luminance levels of $(A+3B)/4$, $(A+B)/2$ and $(3A+B)/4$ which lie between the values of the current (A) and previous (B) pixels. Accordingly, a linear approximation of pixel values is produced at four times the input sample rate. As previously noted, the use of interpolation has an advantage in producing smoother diagonal lines that the alternative sample rate conversion method of simply repeating each incoming pixel to quadruple the sample rate.

FIG. 8B is a block diagram of (preferred) alternative form of an interpolating sample rate converter which does not require the use of multipliers as in the arrangement of FIG. 8A. The converter comprises an input terminal 820 to which luminance signal Y13 is applied and an output terminal 830 at which the 1:4 sample rate interpolated luminance signal Y14 is produced. Terminal 820 is coupled to terminal 830 via a cascade connection comprising a 1 to 4 sample rate repeater 822, digital filter having a Z-transform of 1-Z (exp. −1), a second digital filter having a Z transform of 1-Z (exp. −2) 826 and a divide by four divider 828. The sample repeater 822 repeats incoming samples to provide four identical output samples for each sample received. The first digital filter may be implemented as an adder which adds an input sample to a previous sample delayed by one sample interval. No multiplication is required. The second digital filter may be implemented by an adder which adds the output of the first filter to a signal corresponding to the output of the first filter delayed by two sample periods. Again, no multiplication is required. The output of the second filter is scaled down by a factor of four by divider 828. The output signal thus produced is the same as in the previous example. Advantageously, in this preferred embodiment of the sample rate converter, no multiplication is required at any stage and so the circuit is substantially simplified over that of the previous example.

FIGS. 10, 11 and 12 illustrate various alternative implementations and alternative non-linear response characteristics for control signal generator 46. In its most simple form the control signal generator 46 may be implemented, as shown in FIG. 10, by applying the motion indicating signal M to one input 1004 of a threshold detector 1002 which receives a reference signal R at its other input 1006 and provides a binary valued (i.e., on/off) output signal at output 1008 indicating when the motion indicating signal M is above or below the reference signal. This, threshold type of operation is illustrated by response curve K-1 in FIG. 12 where it is seen that for values of the motion signal M below the reference level R the value of the control signal K is zero, otherwise, the value of the control signal K is unity.

FIG. 11 illustrates a preferred implementation of the control signal generator 46 in which the motion indicating signal M is applied to the address inputs 1104 of a read-only memory (ROM) 1102 which provides the control signal K at its output 1106. This generator can produce the threshold response of curve K-1 shown in FIG. 12 and it can also produce other, more complex, non-linear responses illustrated by the response curves K-2 and K-3 in FIG. 12. In the example of response K-2 in FIG. 12 the control signal K changes relatively slowly for small and large values of the motion signal M and changes relatively rapidly for intermediate values of the motion signal M. In the example of response K-3 the control signal increases rapidly for small values of motion and increases less rapidly for larger values of motion. The use of non-linear response curves for control signal generator 46 is preferred over the example of binary valued threshold detection because changes in the curves (e.g., K-2 or K-3) are much less abrupt and thus less noticeable to a viewer of the processed video signal.

Figure 13A:
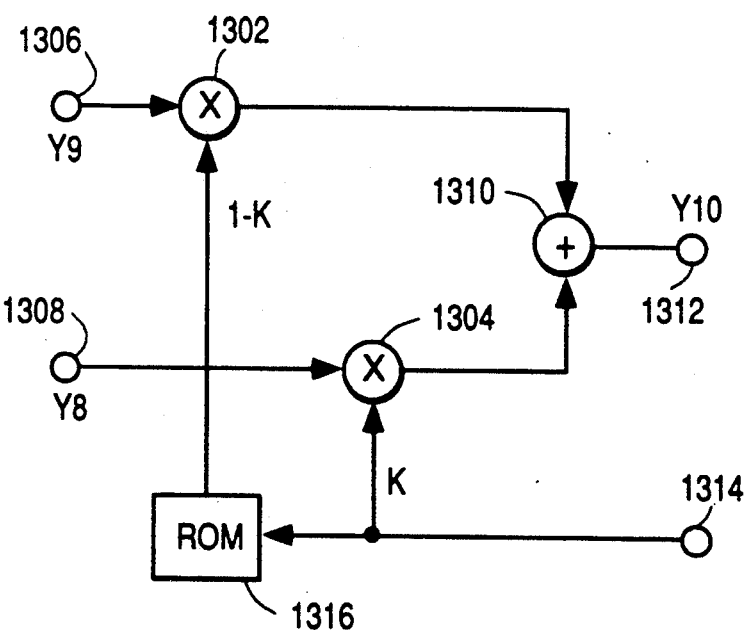
FIGS. 13A and 13B are block diagrams of "soft switches" suitable for use in the receiver of FIG. 1.

FIG. 13A is an example of a suitable implementation of soft switch 50 which comprises a pair of multipliers 1302 and 1304 which receive, respectively, the field delayed (Y9) and the line averaged (Y8) luminance signals at inputs 1306 and 1308 and have outputs connected to an adder 1310 that provides the blended luminance signal Y10 at its output 1312. Multiplier 1304 is controlled directly by the control signal K applied to input 1314 and multiplier 1302 is controlled by a signal equal to 1-K provided by a read only memory (ROM) 1316 which is addressed by the control signal K.

In operation, for no motion (K=0) multiplier 1302 passes the field delayed luma signal Y9 to the output via adder 1310 and multiplier 1304 blocks the line averaged luminance signal Y8. For high motion (K=1) the line averaged luminance signal Y8 is passed to the output by multiplier 1304 and adder 1310 and the field delayed luminance signal is blocked by multiplier 1302. For intermediate degrees of motion (0<K<1) the output signal is blended or combined in the proportions of K and 1-K.

Figure 13B:
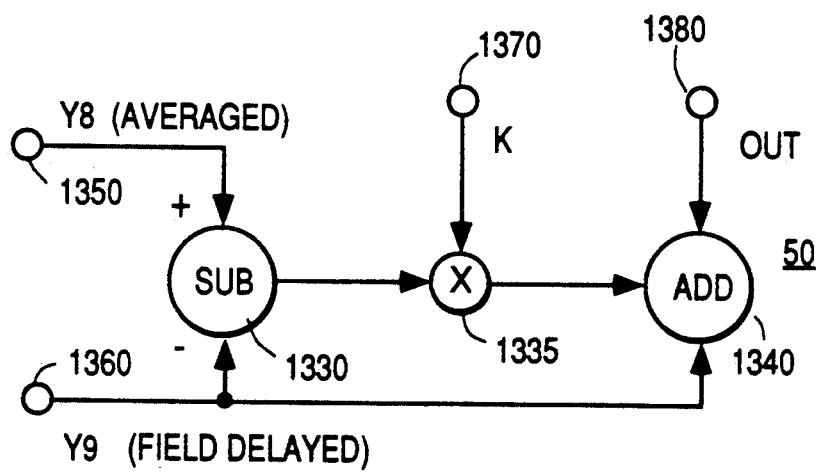

FIG. 13B is a preferred example of a suitable implementation of soft switch 50 which requires only one multiplier. The switch comprises a subtractor 1330 having an output coupled via a multiplier 1335 to one input of an adder 1340. The line averaged luminance signal Y8 at input 1350 is applied to the positive or non-inverting input (+) of subtractor 1330. The field delayed luminance signal Y9 at input 1360 is applied to adder 2340 and to the subtractive (−) input of subtractor 1330. The control signal K is applied to the other input of multiplier 1335.

In operation, when there is no motion (K=0) the field delayed luminance signal Y9 is coupled to the output 1380 via adder 1340. For this case signal Y8 may be ignored because multiplier 1335 blocks the signal Y8 when K equals zero. For the case where there is a lot of motion (K=1) multiplier 1335 couples Y8 and minus Y9 to adder 1330 which receives plus Y9 at its other input. Accordingly, for this case the Y9 signals, being our of phase, cancel each other and the adder output is signal Y8. For any value of K between the limits one and zero (0<K<1) the output signal comprises Y8 and Y9 blended in accordance with the control signal K. o K.

Figure 14:
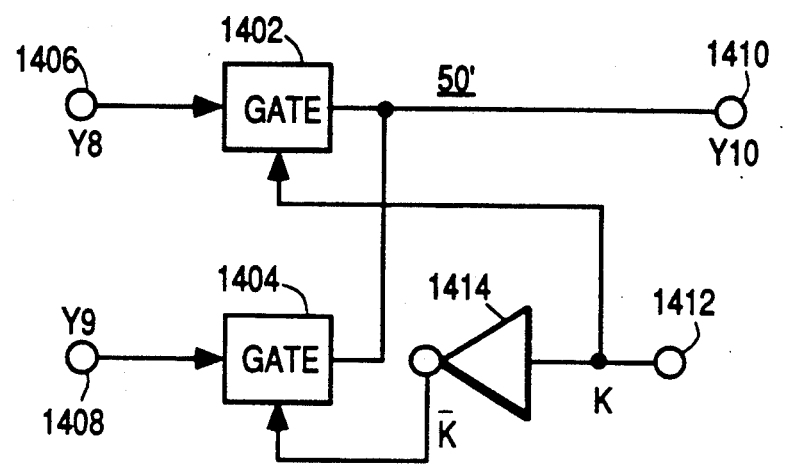
FIG. 14 is a block diagram of a "hard switch" suitable for use in the receiver of FIG. 1 as an alternative to the "soft switch" of FIG. 13.

As an alternative to the use of a "soft switch" for blending the line averaged and field delayed luminance signals, one may instead use a "hard" switch as shown in FIG. 14 controlled by a threshold detector (e.g., FIG. 10) This switch provides no blending but simply selects one or the other of the line-averaged (Y8) or field delayed (Y9) luminance signals depending on whether the motion signal is above or below a threshold as illustrated in FIG. 12. The hard switch comprises a pair of gates 1402 and 1404 having inputs 1406 and 1408 to which the line averaged (Y8) and the field delayed (Y9) luminance signals are applied and having outputs coupled to a common output terminal 1410. The control signal K at input 1412 is applied directly to the control input of gate 1402 and is applied via an inverter 1414 to the control input of gate 1404.

In operation, if the motion signal M is greater than the reference voltage R then K will equal unity and gate 1402 will be enabled thereby coupling the line averaged luminance signal Y8 to the output 1410. Otherwise, gate 1404 is enabled so as to couple the field delayed luminance signal Y9 to the output 1410. This form of "hard" switching has an advantage in terms of simplicity over the preferred alternative of "soft" switching which, as previously noted, has an advantage in providing smoother transitions between line and field processing for scenes having substantial changes in motion.

Figure 15:
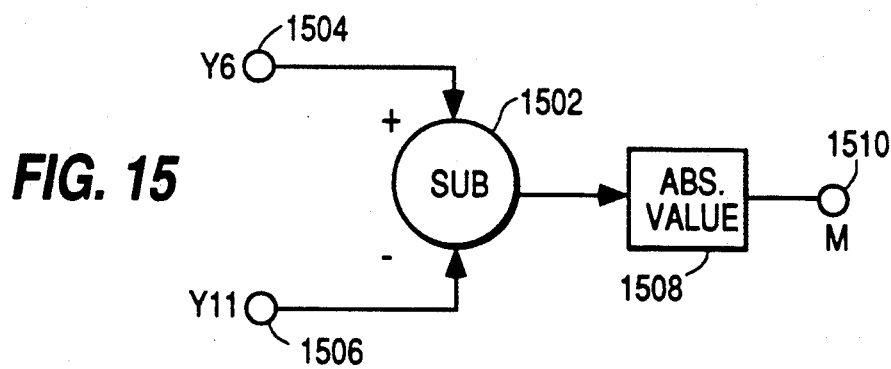
FIG. 15 is a block diagram of a motion detector suitable for use in the receiver of FIG. 1.

FIG. 15 is exemplary of one form of a motion detector suitable for use as detector 44. In this example the non-delayed luminance signal Y6 and the frame delayed luminance signal Y11 are applied to respective inputs 1504 and 1506 of a subtractor and the subtractor output is applied to an absolute value circuit 1508 which provides the motion indicating signal M (at output 1510) in proportion to the absolute value of the difference of the non-delayed luminance signal Y6 and the frame delayed luminance signal Y11. The reason the absolute value circuit is included in this example is that the subtractor output may be either positive or negative and only one polarity is needed for control of the blending switch 50. The absolute value circuit, in other words, "rectifies" the subtractor output to a single polarity. An alternative is to omit the absolute value circuit and utilize the full subtractor output (both positive and negative values) for controlling address inputs of the control signal generator read-only memory (e.g., ROM 1102). Yet another alternative for motion detector 44 is the "side band energy detector" type described in the aforementioned Pritchard U.S. Pat. No. 4,641,186. The subtractor type of motion detector is preferred in the present invention because of its relative simplicity.

Figure 16:
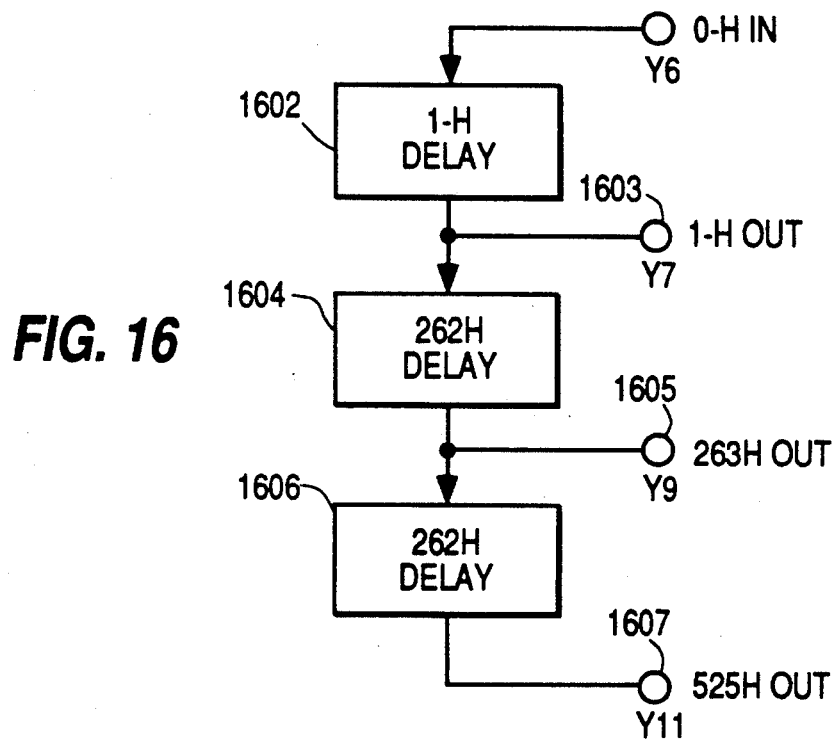
FIGS. 16 and 17 are block diagrams of frame delay circuits having line and field taps and which are suitable for use in the receiver of FIG. 1.
Figure 17:
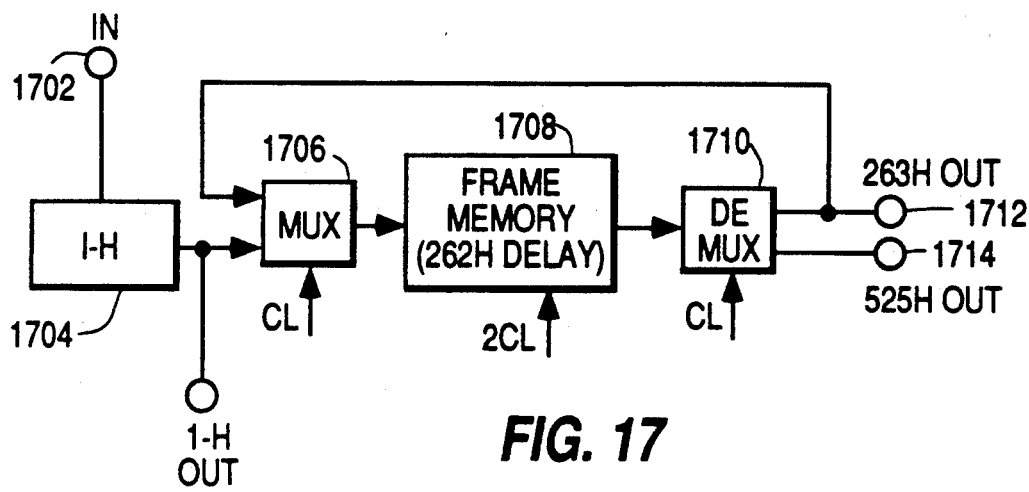

FIGS. 16 and 17 illustrate alternative implementions of delay unit 42 which provides the line delayed output signal Y7, the field delayed output signal Y9 and the frame delayed output signal Y11. The exact delay of these signals depends, as will be readily recognized, on the video transmission standard (e.g., NTSC, PAL or SECAM). In the example of FIG. 16 (where NTSC standard is assumed) the tapped frame delay is implemented by a cascade connection of a 1-H delay 1602, a 262 H delay 1604 and another 262H delay 1606 thereby providing delayed luminance output signals Y7, Y9 and Y11 at outputs 1603, 1605 and 1607, respectively.

A presently preferred implementation of delay unit 42 is shown in FIG. 17 in which the signal to be delayed is applied to the input 1702 of a 1-H delay unit 1704 and thence, via a multiplex switch 1706, to a memory 1708 that has a memory capacity of one frame and that provides a total delay of a field. The output of frame memory 1708 is applied to a de-multiplex switch 1710 that provides a field delayed output signal at terminal 1712 and a frame delayed output signal at terminal 1714. The field delayed output signal is coupled back to the other input of switch 1706 and is thereby interleaved with the frame delayed signal in the memory 1708. By this means, the contents of memory comprise interleaved field and frame delayed signals which are separated at the output by means of the demultiplex switch 1710. Further details of this example of tapped frame delay unit 42 are presented in U.S. Pat. No. 4,639,783 of R. T. Fling entitled VIDEO SIGNAL FIELD/FRAME STORAGE SYSTEM which issued Jan. 27, 1987.

Figure 18:
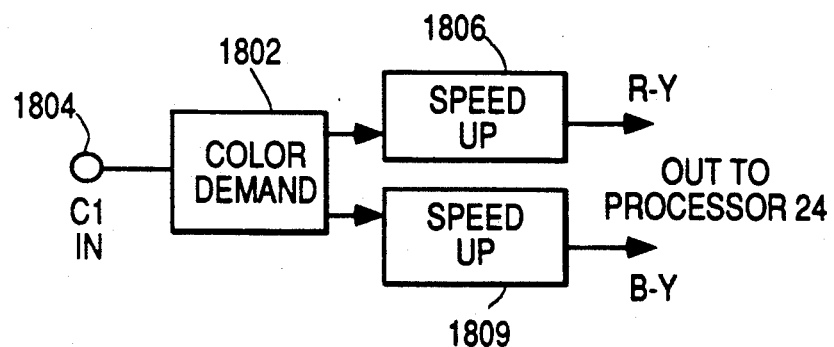
FIG. 18 is a block diagram illustrating a modification of the color signal processing in the receiver of FIG. 1.

FIG. 18 illustrates a modification of the color signal processing in the receiver of FIG. 1 wherein the separated chrominance signal C1 provided by separator 12 is applied to the input 1804 of a color demodulator 1804 which provides demodulated (baseband) output color signals (e.g., R-Y and B-Y) to respective speed-up units 1806 and 1808 which supply double line rate demodulated chrominance signals to the YC processor and matrix unit 24. Demodulation of the chrominance signal prior to speed-up, as shown in this example, does require two color speed-up circuits but is presently preferred as having the advantage of performing the demodulation at a lower clock frequency than would otherwise be required if the color demodulation were done after speed-up as in the previous example.

Figure 19:
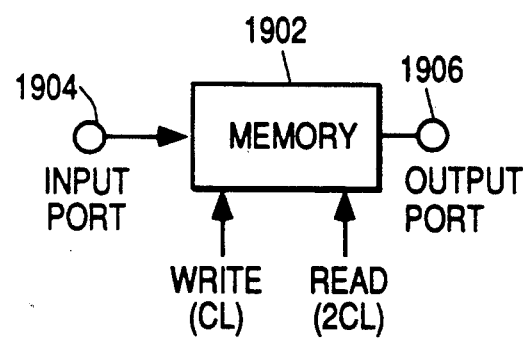
FIG. 19 is a further example of a speed-up circuit suitable for use in the receiver of FIG. 1.
Figure 20:
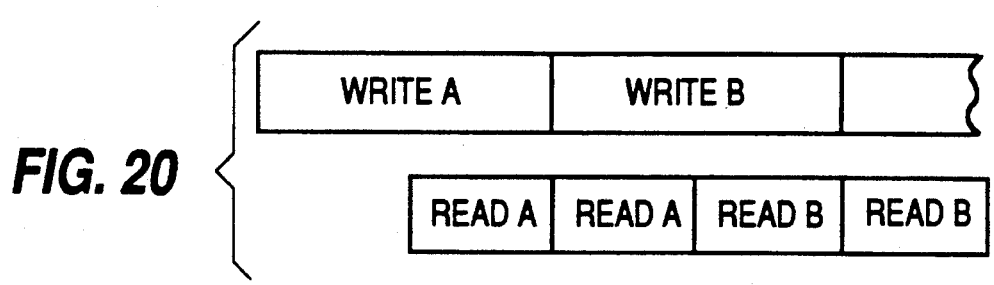
FIG. 20 is a read/write timing diagram illustrating the operation of the speed-up circuit of FIG. 19.

FIG. 19 is exemplary of another speed-up circuit suitable for use in the receiver of FIG. 1 which employs a random access memory 1902 of the dual port type having an input port 1904 for receiving a digital signal to be speeded up and an output port 1906 providing the speeded-up video output signal. This type of memory allows read and write operations to occur essentially at the same time which is illustrated in FIG. 20. As shown incoming lines A and B are stored in the memory in response to the write clock (CL). The start of the first line A read cycle starts half-way through the line A write cycle. Reading is done at twice the write clock rate and so line A is time compressed by a factor of two.

The start of the second line A read cycle begins upon completion of the line A write cycle and at the beginning of the line B write cycle. The use of dual ported memories is presently preferred in that it is less complex that the other examples discussed. It will also be noted that the delay involved between the start of a write cycle and the start of the first corresponding read cycle is only half of one line rather than a full line as in the previous examples.

Various other changes may be made to the embodiment of FIG. 1 other than those specifically enumerated and described above. For example, it is not necessary that any of the signal processing be done by the preferred method of digital signal processing. Suitable delays may be provided by other methods such as by use of CCD devices as have been described. Arithmetic operations for analog embodiments may be implemented by analog devices such as operational amplifier, resistive summing networks and the like. The invention, as defined by the following claims includes all analog and digital alternatives to the specific elements described.

What is claimed is:

1. Progressive scan conversion apparatus, comprising:
   a source for providing a luminance input signal of a given line rate;
   an input circuit coupled to said source for providing a low frequency luminance difference signal representative of a difference between a first low frequency component derived from of a current line of said luminance input signal and a second low frequency component derived by motion adaptation from at least one previous line of said luminance input signal;
   an output circuit for selectively combining said low frequency luminance difference signal and said luminance input signal to form a progressive scan video output signal of double said given line rate and in which every other line thereof is subjected to motion compensation of a low frequency portion thereof and is not subject to motion compensation of a high frequency component thereof; and wherein
   said motion adaptation provided by said input circuit includes a motion responsive blending circuit responsive to a sub-sampled and low pass filtered version of said video luminance signal for providing a blended video output signal; and a subtracter coupled to input and output terminals of said blending circuit for providing said low frequency luminance difference signal.

2. Progressive scan conversion apparatus, comprising:
   a source for providing a non-composite digital video input signal of a given line rate;
   an input circuit coupled to said source for providing a motion compensated low frequency video difference signal representative of a difference between a first low frequency component derived from of a current line of said video input signal and a second low frequency component derived from at least one previous line of said video input signal;
   an output circuit for selectively combining said motion compensated low frequency video difference signal and said video input signal to form a progressive scan video output signal of double said given line rate and in which every other line thereof is subjected to motion compensation in a low frequency portion thereof and is not subject to motion compensation in a high frequency portion thereof; and wherein said input circuit includes:
a line averager for vertically interpolating lines of said low frequency component of said video input signal;
a field delay unit for delaying said low frequency component of said video input signal by one field; and
a motion responsive switch coupled to said averager and to said field delay unit for providing said motion compensated low frequency component derived from said at least one previous line of said video input signal.

3. Progressive scan conversion apparatus, comprising:
a source for providing a non-composite video input signal of a given line rate;
an input circuit coupled to said source for providing a low frequency video difference signal representative of a difference between a first low frequency component derived from of a current line of said video input signal and a motion compensated low frequency component derived from at least one previous line of said video input signal;
an output circuit for selectively combining said motion compensated low frequency video difference signal and said video input signal to form a progressive scan video output signal of double said given line rate and in which every other line thereof is subjected to motion compensation of a low frequency portion thereof and is not subject to motion compensation in a high frequency portion thereof; and wherein
said video input signal is of digital form having a given sample rate and wherein said input circuit includes:
circuit means for low pass filtering and sub-sampling said video input signal;
a motion adaptive processor responsive to the sub-sampled low pass filtered video input signal for providing a motion adaptively processed sub-sampled low frequency video signal; and
a subtracter having inputs coupled to receive said low pass filtered and sub-sampled video input signal and said motion adaptively processed sub-sampled low frequency video signal and having an output providing said motion compensated low frequency video difference signal.

4. Apparatus as recited in claim 3. wherein:
said inputs of said subtracter are coupled to subtract said subsampled video input signal from said motion adaptively processed subsampled video signal to form said motion compensated low frequency video difference signal; and
said output circuit includes means for doubling the line rate of said motion compensated low frequency video difference signal, for doubling the line rate of said video input signal and for adding a line of the resultant double line-rate motion compensated low frequency video difference signal to every other line of the resultant double line-rate video input signal for forming said progressive scan output signal.

5. Apparatus as recited in claim 3 wherein:

said inputs of said subtracter are coupled to subtract said motion adaptively processed sub-sampled video signal from said sub-sampled video input signal to form said motion compensated low frequency video difference signal; and
said output circuit includes means for doubling the line rate of said motion compensated low frequency video difference signal, for doubling the line rate of said video input signal and for subtracting a line of the resultant double line rate motion compensated low frequency video difference signal from every other line of the resultant double line rate video input signal for forming said progressive scan output signal.

6. Progressive scan conversion apparatus, comprising:
a source for providing a luminance input signal of a given line rate;
an input circuit coupled to said source for providing a motion compensated low frequency luminance difference signal representative of a difference between a first low frequency component derived from of a current line of said luminance input signal and a second low frequency component motion adaptively derived from at least one previous line of said video input signal; and
an output circuit for selectively combining said motion compensated low frequency luminance difference signal and said luminance input signal to form a progressive scan video output signal of double said given line rate and in which every other line thereof is subjected to motion compensation of a low frequency component thereof and is not subject to motion compensation of a high frequency component thereof; and wherein
said input circuit comprises:
a field delay unit for delaying said first low frequency component by one field;
a line averager for averaging vertical lines of said first low frequency component;
a motion responsive blending switch for blending portions of output signals provided by said field delay unit and said line averager to provided a blended luminance signal; and
means responsive to said blended luminance signal and to said first low frequency component of said luminance input signal for providing said motion compensated low frequency luminance difference signal.

7. Progressive scan conversion apparatus, comprising:
a source for providing a non-composite digital video input signal of a given line rate and a given sample rate;
a sub-sampling circuit coupled in series with a low pass filter to said source for providing a sub-sampled low frequency video signal;
an input circuit coupled to said sub-sampling circuit for providing a sub-sampled low frequency video difference signal representative of a difference between a first low frequency component derived from of a current line of said sub-sampled low frequency video input signal and a second low frequency component derived from at least one previous line of said sub-sampled low frequency video input signal; and
an output circuit for processing said sub-sampled low frequency video difference signal and said video input signal to form a progressive scan video output signal of double said given line rate and in which every other line thereof is subjected to motion compensation of a low frequency portion thereof and is not subjected to motion compensation of a high frequency portion thereof;

said output circuit comprising:

circuit means for doubling the line rate and up-sampling said sub-sampled video difference signal and for doubling the line rate of said video input signal; and combining means for combining a line of resultant double line-rate up-sampled video difference signal with every other line of the resultant double line-rate video input signal to form said progressive scan output signal; and wherein said input circuit includes:

a motion responsive blending circuit responsive to said subsampled video input signal for providing a blended video output signal; and a subtracter having inputs coupled to input and output terminals of said blending circuit for providing said sub-sampled low frequency video difference signal.

8. Progressive scan conversion apparatus, comprising:

a source for providing a non-composite digital video input signal of a given line rate and a given sample rate;

a sub-sampling circuit coupled in series with a low pass filter to said source for providing a sub-sampled low frequency video signal;

an input circuit coupled to said sub-sampling circuit for providing a sub-sampled low frequency video difference signal representative of a difference between a first low frequency component derived from of a current line of said sub-sampled video input signal and a second low frequency component derived by blending low frequency components of lines from a current and a previous field; and an output circuit for processing said sub-sampled video difference signal and said video input signal to form a progressive scan video output signal of double said given line rate in which every other line thereof is subjected to motion compensation of a low frequency portion thereof and is not subjected to motion compensation of a high frequency component thereof; and wherein said input circuit includes:

a line averager for vertically interpolating lines of said sub-sampled video input signal;

a field delay unit for delaying said sub-sampled video input signal by one field; and a motion responsive switch coupled to said averager and to said field delay unit for selectively combining output signals thereof for producing said second low frequency component.

9. Progressive scan conversion apparatus, comprising:

a source for providing a digital luminance input signal of a given line rate and a given sample rate;

a sub-sampling circuit coupled to said source for providing a sub-sampled low frequency luminance signal;

an input circuit coupled to sub-sampling circuit for providing a sub-sampled low frequency luminance difference signal representative of a difference between a first low frequency component derived from of a current line of said sub-sampled luminance input signal and a second low frequency component derived by motion compensation from at least one previous line of said sub-sampled low frequency luminance input signal; and an output circuit for processing said sub-sampled low frequency luminance difference signal and said luminance input signal to form a progressive scan video output signal of double said given line rate in which every other line thereof is subjected to motion compensation of a low frequency component thereof and is not subjected to motion compensation of a high frequency component thereof; and wherein said input circuit comprises:

a field delay unit for delaying said sub-sampled luminance input signal by one field;

a line averager for averaging vertical lines of said sub-sampled luminance input signal;

a motion responsive blending switch for blending portions of output signals provided by said field delay unit and said line averager to provided a sub-sampled blended luminance signal that is motion compensated; and means responsive to said blended luminance signal and to said sub-sampled luminance input signal for providing said low frequency luminance difference signal.

10. Progressive scan conversion apparatus, comprising:

a source for providing a non-composite digital video input signal of a given line rate and a given sample rate;

a sub-sampling circuit coupled in series with a low pass filter to said source for providing a sub-sampled low frequency video signal;

a motion adaptive processor responsive to said sub-sampled low frequency video signal for providing a motion adaptively processed sub-sampled low frequency video signal;

a subtracter having inputs coupled to receive said sub-sampled video input signal and said motion adaptively processed sub-sampled low frequency video signal and having an output for providing a sub-sampled low frequency video difference signal; and an output circuit responsive to said video input signal and to said sub-sampled low frequency video difference signal for forming a progressive scan output signal in which every other line thereof is subjected to motion compensation of a low frequency portion thereof and is not subjected to motion compensation in a high frequency portion thereof.

11. Apparatus as recited in claim 10 wherein said output circuit comprises:

first means for doubling the line rate of said non-composite video input signal;

second means for doubling the line rate and for increasing the sample rate of said sub-sampled low frequency video difference signal to provide a processed low frequency video difference signal having the same line rate and sample rate as a double line-rate video signal produced by said first means; and means for combining a line of said processed low frequency video difference signal with every other line of the double line rate video input signal to provide said progressive scan output signal.

12. Apparatus as recited in claim 10 wherein said output circuit comprises:
   a first speed-up circuit for doubling the line rate of said sub-sampled low frequency video input signal;
   a second speed-up circuit and sample rate converter for doubling the line rate and up-converting the sample rate of said sub-sampled low frequency difference signal;
   a switch for selecting solely alternate lines of said double line rate up-converted low frequency difference signal; and
   combining means for combining output signals provided by said first speed-up circuit and said switch to form said progressive scan output signal.

* * * * *